United States Patent
Parra

(10) Patent No.: US 9,550,508 B1
(45) Date of Patent: Jan. 24, 2017

(54) NON-RIGID WHEELED CART

(71) Applicant: Jose Parra, Dublin, CA (US)

(72) Inventor: Jose Parra, Dublin, CA (US)

(*) Notice: Subject to any disclaimer, the term of this patent is extended or adjusted under 35 U.S.C. 154(b) by 0 days.

(21) Appl. No.: 14/865,427

(22) Filed: Sep. 25, 2015

(51) Int. Cl.
*B62B 3/00* (2006.01)
*B62B 3/10* (2006.01)
*B62B 3/04* (2006.01)
*B62B 5/06* (2006.01)

(52) U.S. Cl.
CPC . *B62B 3/10* (2013.01); *B62B 3/04* (2013.01); *B62B 5/06* (2013.01)

(58) Field of Classification Search
CPC ...... B60B 33/0005; B60B 3/04; B60B 5/0089; B60B 1/20; B60B 1/208; B60B 3/00
See application file for complete search history.

(56) References Cited

U.S. PATENT DOCUMENTS

| | | | | |
|---|---|---|---|---|
| 2,593,962 A * | 4/1952 | Barker | ...................... | A47D 1/06 280/30 |
| 3,871,676 A * | 3/1975 | Renard | ................ | A45C 13/385 280/35 |
| 4,790,559 A * | 12/1988 | Edmonds | ................ | B62B 1/208 280/47.315 |
| 5,169,164 A * | 12/1992 | Bradford | ................... | B62B 1/20 190/18 A |
| 6,923,468 B1 * | 8/2005 | Barnett | ..................... | B62B 3/04 280/35 |
| 7,207,576 B1 * | 4/2007 | Ibarra | ................... | B62B 5/0083 280/30 |
| 7,213,820 B2 * | 5/2007 | Drummond | ......... | B60B 33/0005 280/47.34 |
| 8,123,236 B1 * | 2/2012 | Helenihi | ................... | B62B 1/20 280/33.991 |
| 2015/0115555 A1 * | 4/2015 | Cates | .................... | B62B 5/0089 280/47.26 |

\* cited by examiner

*Primary Examiner* — Hau Phan
(74) *Attorney, Agent, or Firm* — Dahyee Law Group; Leon E. Jew; Rouzbeh Alani

(57) ABSTRACT

An assembly for transporting containers and more specifically an ice chest cooler to a desired location is described. The assembly comprises a strap which has been sewn together to form the shape square in the center. On end of the square, the fabric extends out and contains a fastener to connect to the handle of the ice chest cooler. On the other end, the fabric extends to form a handle. Assembled to the fabric is a pair of axles. The two axles are coupled at their ends to a pair of wheels on the front and rear of the assembly while the cooler is positioned on top of the axles. One method of assembling the axles to the fabric is by puncturing precise holes in the fabric to pass the axle through the fabric and mate the fabric and axle to the inner side of the wheels.

8 Claims, 5 Drawing Sheets

NON-RIGID WHEELED CART

FIELD OF THE INVENTION

The present invention generally relates to the field of transportation of containers. More particularly, the invention relates to transporting handled containers such as an ice chest cooler to a desired location by using a non-rigid wheeled cart.

BACKGROUND OF THE INVENTION

The weight and bulk of heavy objects such as handled or non-handled containers has consistently presented a material transport problem. In most instances, the typical practice is to use the human muscles of the arms, legs, and back to lift the heavy and sometimes non-uniform shape of the container up from off the ground and to the desired destination. In a specific instance, when the container is for example an ice chest cooler, the cooler can be used to store products such as foods and beverages to and thus, the cooler can become extremely heavy. When attempting to transport a cooler filled with products such as beverages and foods, lifting the cooler can be strenuous on the human body. One alternative method for transporting the heavy ice chest cooler can be dragging and pushing the cooler instead. This type of transportation can be stressful on muscles and joints on the human body and can also be frustrating for the user at the same time. In the past, there have been inventions by inventors who have sought to help ease the transporting of heavy containers. Some prior inventions to help solve this problem have included assemblies consisting of a storage container connected to a rigid member on wheels to help with transportation of containers and other articles of use. For example, in U.S. Pat. No. 5,197,754, a cart for carrying articles to the beach is described. The invention is an assembly which includes a cart with a rigid frame with a collapsible handle, a rear support section, and an axle with removable wheels with a storage member for attaching the wheels to the frame. Further, a rigid member is hinged to the frame and is extendable to support the lower portion of the article carrier and which can be folded against the frame to facilitate storage of the cart. This type of invention has proven to be useful for certain cases however, there a large number of assembly components including a rigid frame which can be costly to manufacture.

Another prior art invention is designed for transporting an ice cart. In U.S. Pat. No. 7,207,576, an Ice Cart is described which includes a container along with a frame on wheels to transport a container such as an ice chest container filled with products such as food and to a desired location. The invention includes a container with handles, a plurality of straps meant for attaching and containing an ice chest container to a frame with a back panel. On the frame, two wheels are attached to help with rolling the ice chest container as the user pulls the ice chest container to the desired location. As described in the specification of the invention, the straps are tied to the handles of the ice chest container, and the user can pull the straps to transport the container using a form of mechanical advantage.

Although the prior inventions consist of assemblies that can be useful for carrying heavy, bulky containers from one point to another desired location, the prior inventions particularly U.S. Pat. No. 7,207,576, requires the assembly to have a rigid frame to place the ice chest container before transporting. One disadvantage to this invention is that it can be cumbersome for assembly purposes and may require more effort to put the invention together before using it for the intended application. U.S. Pat. No. 7,207,576 may have unnecessary assembly components such as a rigid frame which can also be costly to manufacture.

When attempting to transport bulky and heavy containers such as an ice chest cooler, it is an advantage for the user to be able to place the ice chest container on top of a non-rigid cart with wheels and use the weight of the actual ice chest cooler to balance and support the assembly during transportation. This is an ingenious means for transporting a heavy container such as an ice chest cooler, and one advantage of this type of non-rigid wheeled cart is for the entire assembly to be lightweight and easier to assemble before using the assembly for the purpose of transporting a heavy container.

Therefore, what is needed to serve as an advantage for a user is a lightweight wheeled cart with a handle at the front and an anchor clip at the rear using the weight of the container for support and balance to transport a heavy container such as an ice chest cooler from one point to another desired location. This novel non-rigid wheeled cart is inexpensive to manufacture, rugged in construction, and simple in design.

SUMMARY OF THE INVENTION

Accordingly, the present invention is an assembly of components for carrying and transporting a container and more specifically an ice chest cooler to a desired location. The assembly comprises a webbed fabric which has been sewn together to form the shape of the overall assembly. On one end of the sewn fabric is a loop with a fastener to connect to the handle of the ice chest cooler. On the other end of the sewn fabric is a triangular shaped design with a plastic cover on one side of the triangular shape. The plastic cover is meant to prevent rope burn when the user is pulling the assembly and ice chest cooler towards a desired destination. Assembled to the webbed fabric are two axles which are connected to the sewn webbed fabric. The axles allow the assembly to take the shape of a square in the middle of the assembly. This allows the ice chest cooler which is normally rectangular in shape, to rest on top of the axles and fabric. Each of the two of axles is connected at their ends to two sets of wheels on the front side of the assembly and the rear side of the assembly. One method of assembling the axles to the fabric is by puncturing precise holes in the fabric to pass the axle through the fabric and mate the fabric and axle to the inner section of the wheels. At the end of the axle, the center hole of the wheel can be press fit into the axle for a secure assembly. Another way is to securely connect the axle to the wheels is by having extruded threaded ends on both sides of the axles. Extruding out from the axle sheaths of the axle, a threaded section can pass through the center hole of the wheels and a nut can be used on the threads to securely fasten the wheels to the axle.

Second Preferred Embodiment

In another embodiment of the invention, the sewn fabric is bent one time to overlap itself. Again, on one end of the sewn fabric is a loop with a fastener to connect to the handle of the ice chest cooler. On the other end of the sewn fabric is a triangular shaped design with a plastic cover on one side of the triangular shape. The plastic cover is meant to prevent rope burn when the user is pulling the assembly and ice chest cooler towards a desired destination The sewn fabric is bent at the four corners in which the axle is to mate with the wheels. When the sewn fabric is bent over itself one time, the assembly becomes more robust and sturdy. As the holes are punctured precisely through the overlapped sewn fabric, the axle can pass through the sewn fabric and the axle sheaths can mate with the inside section of the wheel. At the end of the axle extruding out from the outside surface of the axle sheath, a threaded section can pass through the center hole of the wheels. A nut can be used on the threads to securely fasten the wheels to the axle.

Third Preferred Embodiment

In another embodiment of the invention, the sewn fabric is designed to have a hole such as a large loop on two sides of the assembly. Again, on one end of the sewn fabric is a loop with a fastener to connect to the handle of the ice chest cooler. On the other end of the sewn fabric is a triangular shaped design with a plastic cover on one side of the triangular shape. The plastic cover is meant to prevent rope burn when the user is pulling the assembly and ice chest cooler towards a desired destination. With this type of large loop design, the axle can pass through the large loops and mate directly to the inside section of the four wheels. At the end of the axle extruding out from the axle sheath, a threaded section can pass through the center hole of the wheels. A nut can be used on the threads to securely fasten the wheels to the axle.

DETAILED DESCRIPTION OF THE DRAWINGS

While the present invention may be embodied in different, forms, designs, or configurations, for the purpose of presenting an understanding of the principles of the invention, references will be made to the embodiments illustrated in the diagrams and drawings. Specific language will be used to describe the embodiments. Nevertheless it is intended to show that no limitation or restriction of the scope of the invention is thereby intended. Any alterations and further implementations of the principles of this invention as described herein are as they would normally occur to one skilled in the art to which the invention relates.

The present invention is an assembly of components for carrying and transporting a container and more specifically an ice chest cooler to a desired location. The assembly comprises a webbed fabric which has been sewn together to form the shape of the overall assembly. On end of the sewn fabric is a loop with a fastener to connect to the handle of the ice chest cooler. On the other end of the sewn fabric is a triangular shaped design with a plastic cover on one side of the triangular shape. The plastic cover is meant to prevent rope burn when the user is pulling the assembly and ice chest cooler towards a desired destination. Assembled to the webbed fabric are two axles which are connected to the sewn webbed fabric. The axles allow the assembly to take the shape of a square in the middle of the assembly. This allows the ice chest cooler which is normally rectangular in shape, to rest on top of the axles and fabric. Each of the two of axles is connected at their ends to two sets of wheels on the front side of the assembly and the rear side of the assembly. One method of assembling the axles to the fabric is by puncturing precise holes in the fabric to pass the axle through the fabric and mate the fabric and axle to the inner section of the wheels. At the end of the axle, the center hole of the wheel can be press fit into the axle for a secure assembly. Another way is to securely connect the axle to the wheels is by having extruded threaded ends on all both sides of the axles. Extruding out from the axle sheath at the end of the axle, a threaded section can pass through the center hole of the wheels and a nut can be used on the threads to securely fasten the wheels to the axle.

Figure 1:
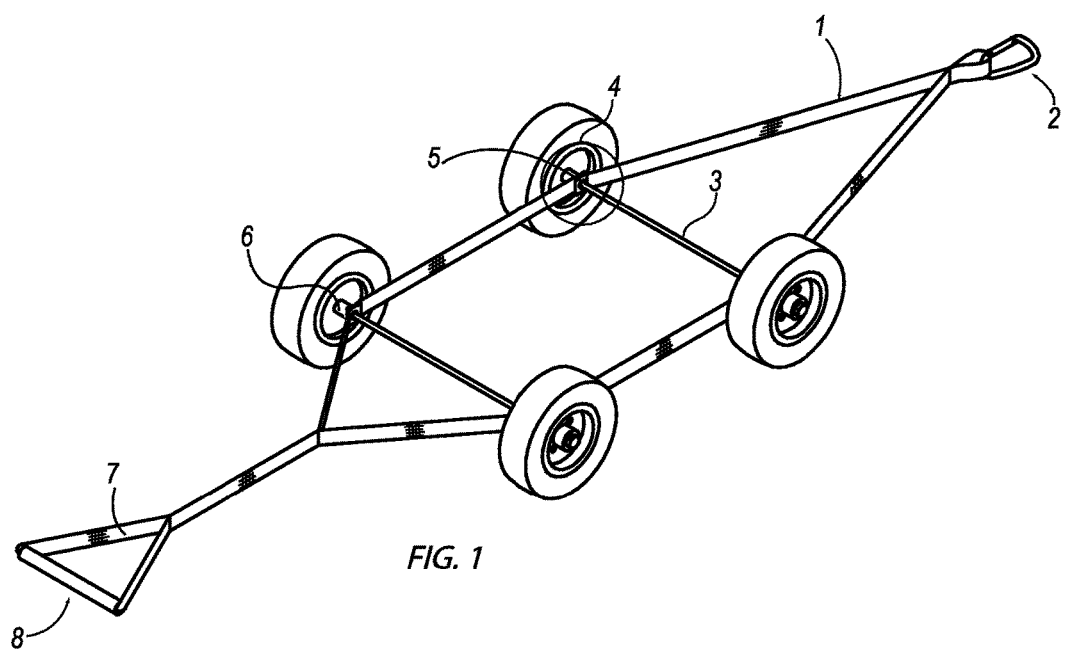
FIG. 1 is an illustration of the Non-rigid wheeled cart invention. The illustration shows all the assembly components, features, and how each component is assembled together to form the invention. The non-rigid application is shown with the key features showing how the invention differs from the prior art and the more common rigid wheeled cart inventions.

FIG. 1 is an illustration of the non-rigid wheeled cart used for transporting a heavy container such as an ice chest cooler from one point to another desired location. As described above in the "Background" section of the specification, a heavy and bulky container such as an ice chest cooler can be difficult to transport when the ice chest cooler is filled with products such as beverages and foods. The handles alone, on the front and back side of an ice chest cooler can be helpful for lifting and transporting, but there may be a tremendous amount of stress applied to the human body, particularly the back muscles and joints. As an advantage, FIG. 1 shows the invention before an ice chest cooler is placed on top of the shown assembly. The assembly is designed to implement a mechanical advantage by use of a long sewn strap 1 made of a webbed fabric which is sewn together for durability and strength. On one end of the sewn fabric strap 1, a loop is formed to connect to a fastener 2 in order to hook onto to one end of the handle of the ice chest cooler (not shown). Two axles 3 are then used to attach to a set of two wheels 4. Then the sewn fabric strap 1 fits through the axles 3 by inserting a hole inside the sewn fabric strap 1 for the axles to pass through and connect to the two wheels 4. Each of the axles is connected to the wheels with and press fit into the wheels. Another method of connecting the axle 3 to the wheels is by having threaded ends extruded from the axle sheath 5 and fastening the wheels 4 to the threaded ends of the axle 3 with a nut. In this manner, the outside surface of the axle sheath 5 connects to the inside part of the wheel. All three components which join for the assembly including the wheel 3, the axle sheath 5 connected to the axle, and the axle 3 all turn in harmony when the assembly is operating.

Further, a hole can be punched or punctured through the sewn fabric strap 1 while the axle sheath 5 of the axle is used between the sewn fabric strap 1 and the wheels 4 to prevent the sewn fabric strap 1 from touching the wheels 4 while the assembly is in motion.

On the other end of the assembly a triangular shape 7 is formed from the sewn fabric strap 1 along with a plastic cover 8 over one side of the triangle to prevent rope burn when the user is pulling a heavy ice chest cooler from one location to another.

Figure 2:
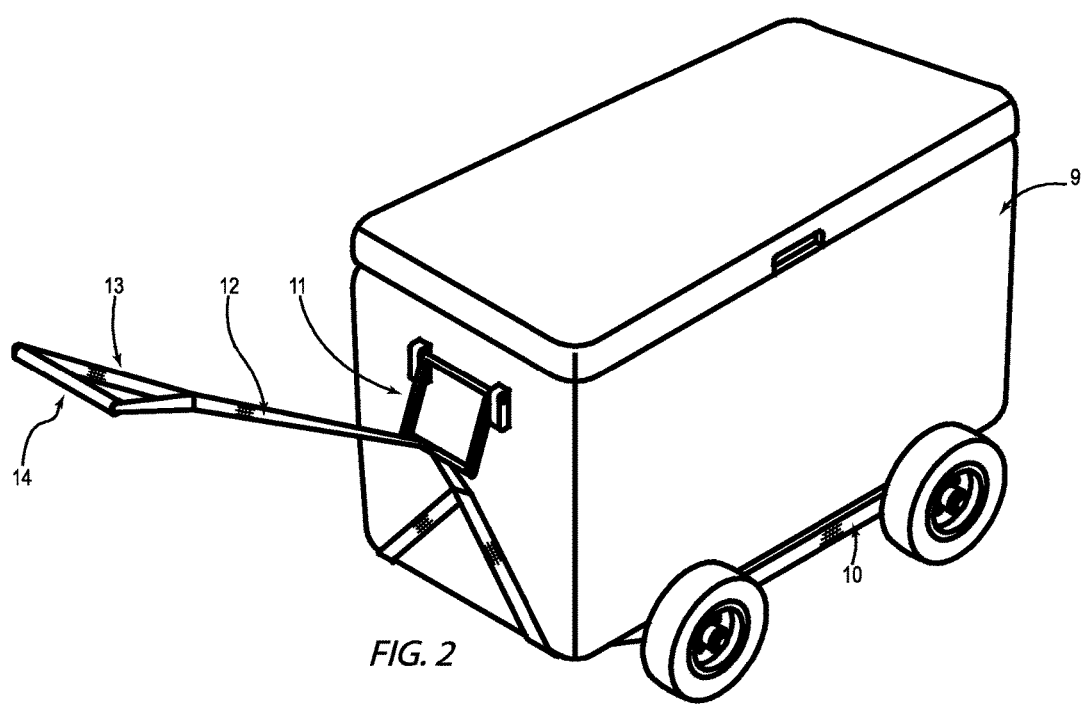
FIG. 2 is an illustration of the invention along with the container, and as an example an ice chest cooler resting on top of the invention. The illustration describes how the invention functions when the ice chest cooler is placed on top of the invention and how the user operates the invention.

FIG. 2 is an illustration of the ice chest cooler 9 placed on top of the non-rigid wheel cart invention 10. This illustration is meant to show how the invention operates when a heavy container such as the ice chest cooler 9 is placed on top of the non-rigid wheel cart invention 10. Often times the ice chest cooler 9 is loaded with products such as beverages and food. This causes the ice chest cooler 9 to become heavy while the overall shape of the ice chest cooler 9 is bulky to begin with. However, when the ice chest cooler 9 is placed in the rectangular position as shown in the FIG. 2 on top of the non-rigid wheel cart invention 10, the transportation of the ice chest cooler 9 becomes much easier. Instead of lifting a loaded, bulky, and heavy ice chest cooler 9 from the handles 11 provided on either side of the cooler, the ice chest cooler 9 only needs to be lifted slightly off the ground and up on to the two axles (not shown) of the non-rigid wheel cart invention.

The weight of the ice chest cooler 9 alone provides for a center of gravity balance to prevent the ice chest cooler 9 from tipping over. By using the handles 11 already provided from the ice chest cooler 9, a mechanical advantage can be implemented by pulling the sewn fabric strap 12 through the square opening of the handle 11 and pulling the ice chest cooler 9 to a desired destination. The triangular shape 13 at one end of the non-rigid wheel cart invention 10 allows for a means for gripping the sewn fabric strap 12 by the user when pulling the ice chest cooler 9. Again, a round plastic cover 14 is implemented on one side of the triangular shape 13 end of the non-rigid cart invention 10 to help the user grip the sewn fabric strap 12 when pulling the assembly and ice chest cooler 9.

Figure 3:
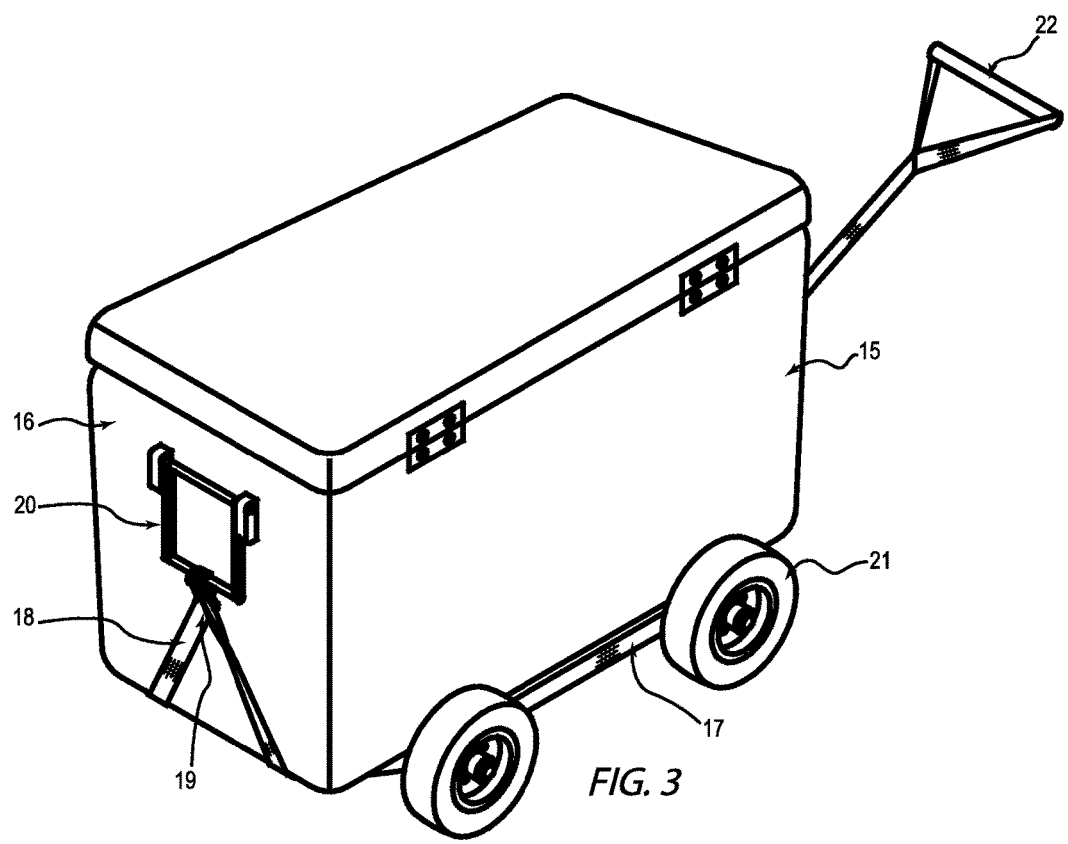
FIG. 3 is also an illustration of the invention along with the container, and as a more specific example an ice chest cooler is shown resting on top of the invention. This illustration shows the rear side of the ice chest cooler for the purpose of showing how the invention and ice chest cooler are assembled together. The description of how the user operates the invention when the ice chest cooler is resting on top is also presented.

FIG. 3 is an illustration of the opposite side of the ice chest cooler 15 which was shown in FIG. 2. In this illustration, the rear side 16 of the ice chest cooler 15 is shown for the purpose of explanation as to how the non-rigid wheel cart invention 17 attaches to the ice chest cooler 15 before transportation. In FIG. 1 the sewn fabric strap 18 had a ring shape at one end. This ring shape 19 is intended for the purpose of looping around the rear handle 20 of the ice chest cooler 16 to help secure a knot around the rear handle 20. This ring shape 19 also helps the user to grip and knot the sewn fabric strap 18 to the ice chest cooler 15 as well. With this configuration, the sewn fabric strap 18 connects securely to the ice chest cooler 15 from one side while the other side of the assembly is used for pulling the cooler. The combination of the large wheels 21 which are attached to the two axles (not shown) below the ice chest cooler 15 help to secure the cooler in place, while the overall size and weight of the ice chest cooler 15 also allows for a lower center of gravity to keep the cooler from tipping over during transportation.

As mentioned in FIG. 1, the axles (not shown) are turning due to the connection to the wheels 21. The wheels, axle sheath of the axle (not shown), and axle all turn together harmoniously and help guide the ice chest cooler 15 when the user is pulling the triangular section 22 of the sewn fabric strap 18.

Figure 4:
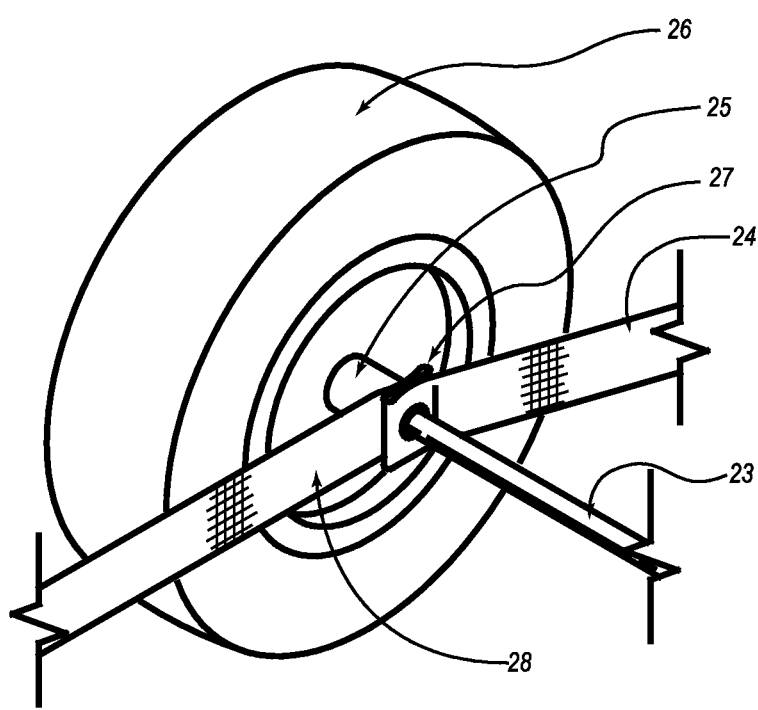
FIG. 4 is an illustration showing details of how several key components of the assembly are assembled together. In this illustration, the connections between the axle, axle cover, sewn fabric strip, and wheel are described in detail.

FIG. 4 is a detailed illustration of the key assembly features of the axle 23, sewn fabric strap 24, axle sheath 25 for the axle, and wheel 26 as they are combined and assembled together to create the non-rigid wheeled cart invention. One method of assembly is to fold the sewn fabric strap 24 over two times as shown in 27 while punching or puncturing a hole through the strap for the axle 23 to pass through. The axle 23 fits into a socket 28 connected to the hole in the sewn fabric strap 24. The axle 23 then mates into the punctured hole and socket 28 to prevent the strap from sliding across towards the center of the axle 23. On the other side of the sewn fabric strap 24 near the wheel 26 is an axle sheath 25 to connect to the axle.

Figure 5:
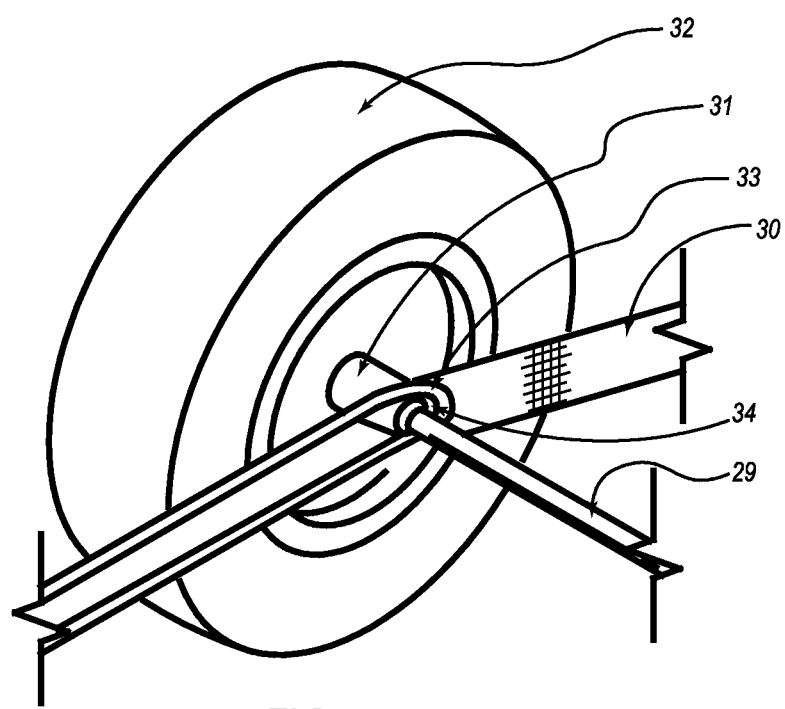
FIG. 5 is an illustration of another embodiment of how several key components of the assembly are assembled together. Again, the connections between the axle, axle cover, sewn fabric strip, and wheel are described in detail.

FIG. 5 is another detailed illustration of another embodiment of the key assembly features of the axle 29, sewn fabric strap 30, axle sheath 31 for the axle, and wheel 32 as they are combined and assembled together to create the non-rigid wheeled cart invention.

One method of assembly is to use a sewn fabric strap 30 with a long loop 34 to fit the axles 29 through the loop 33. This is a different style of assembly as compared to the FIG. 1 and FIG. 4 methods as in this case, no hole is needed to be punch or punctured through the sewn fabric strap 30. The loop 33 allows for the axle 29 to glide straight into the wheel 32. In this particular type of embodiment, the loop extends down to the second axle (not shown) and wraps around the second axle (just as shown in this Figure around axle 29). This method of assembly requires the sewn fabric strap 30 to be sewn in a different way to allow the loop 33 to be created. Two strips of fabric 34 are needed to be stitched together to connect the top section of the loop 33 to the bottom section of the loop 34. This way the axle 29 is prevented from moving back and forth and sliding across the looped area to potentially touch the other axle (not shown) at the other end of the assembly. Each embodiment from this figure and previous figure presents a variation of assembly designs for the sewn fabric strap 30. It is an option for the user to decide on which type of sewn fabric strap to apply and incorporate for the use of transporting a container or ice chest cooler.

Although one or more embodiments of the newly invented assembly have been described in detail, one of ordinary skill in the art will appreciate the modifications to the material selection and assembly components along with the layout of the assembly which does not need a rigid frame to support a container. The use of the weight of the container to provide for a light weight non-rigid cart for transporting containers such as an ice chest cooler is novel and nonobvious. It is acknowledged that obvious modifications will ensue to a person skilled in the art. The claims which follow will set out the full scope of the invention.

The invention claimed is:

1. An assembly for transporting a container with a pair of holding handles symmetrically coupled to two opposite sides of said container, to a desired location comprising a sewn fabric strap having the shape of a square in the middle to hold said container, said square shaped fabric having an inside surface and an outside surface and two ends extending on opposite sides of said square shaped fabric for pulling said container; a first end attached to one outside surface of said square shape, a second end attached to said opposite outside surface of said square shape, said first extending end having a sewn loop coupled to a fastener for coupling with one of said holding handles, said second extending end having a handle coupled to said extending end and passing through the other one of said holding handles on said container for pulling; a pair of axles, said axles having an axle sheath with an inside surface and an outside surface at the end of each side with threads extruding out from said outside surfaces of said axle sheath; two pairs of rubberized wheels on rims with an inside surface and an outside surface and having a center hole in the center of said rims; two pairs of nuts to match the size of said extruded threads wherein said sewn fabric strap is punctured with holes and passed through said axles and set in position with a socket connection, said axles positioned in parallel and affixed with two outside sides of said square shaped fabric while being parallel to said extending ends of said square shaped fabric, said outside surface of said fabric affixed against said inside surface of said axle sheath, said outside surface of said axle sheath mates against the inside surface of said rims, and said threads extruding from the outside surface of said axle sheath passing through said center hole of said rims and bolting on to said rims with said nuts to secure said wheels to said axle.

2. The assembly of claim 1 wherein said sewn fabric strap is folder over itself two times at the location where said punctured holes are made, said punctured holes are made through said folded strap before passing through said axle and positioned securely with said socket connection.

3. The assembly of claim 1 wherein said sewn fabric strap is made with a looped hole on two sides of said square shaped fabric, said axles passing through said looped holes and said outside surface of said axle sheath mating to said inside surface of said rims.

4. The assembly of claim 3 further comprising a sewn fabric to connect said loop around two sides of said axles to securely position said axles and prevent said axles from movement.

5. The assembly of claim 1 wherein one said of said triangular shape of said second end of said sewn fabric strap is covered with a plastic tube for gripping said assembly when transporting said container.

6. The assembly of claim 1 where said fastener is an aluminum clip.

7. The assembly of claim 1 wherein said sewn fabric strap is made of a webbed fabric.

8. The assembly of claim 1 wherein said extending ends of said sewn fabric are in the shape of a triangle.

\* \* \* \* \*